(12) United States Patent
He et al.

(10) Patent No.: US 11,964,220 B2
(45) Date of Patent: Apr. 23, 2024

(54) HYDROPHILIC/OLEOPHOBIC SPONGE, PREPARATION METHOD AND USE THEREOF

(71) Applicant: Guangdong University of Petrochemical Technology, Guangdong (CN)

(72) Inventors: Fu'an He, Maoming (CN); Wenxu He, Maoming (CN); Bo Lin, Maoming (CN); Dehao Li, Maoming (CN); Zengtian Li, Maoming (CN); Wanyi Chen, Maoming (CN)

(73) Assignee: Guangdong University of Petrochemical Technology, Maoming (CN)

( * ) Notice: Subject to any disclaimer, the term of this patent is extended or adjusted under 35 U.S.C. 154(b) by 390 days.

(21) Appl. No.: 17/044,225

(22) PCT Filed: Jun. 18, 2019

(86) PCT No.: PCT/CN2019/091613
§ 371 (c)(1),
(2) Date: Sep. 30, 2020

(87) PCT Pub. No.: WO2020/211186
PCT Pub. Date: Oct. 22, 2020

(65) Prior Publication Data
US 2021/0346823 A1     Nov. 11, 2021

(30) Foreign Application Priority Data

Apr. 16, 2019    (CN) ........................ 201910303861.X

(51) Int. Cl.
*B01D 17/02*    (2006.01)
*C08J 9/42*     (2006.01)

(52) U.S. Cl.
CPC ............ *B01D 17/0202* (2013.01); *C08J 9/42* (2013.01); *C08J 2361/28* (2013.01);
(Continued)

(58) Field of Classification Search
CPC ... B01D 17/0202; C08J 9/42; C08J 2201/038; C08J 2375/04
See application file for complete search history.

(56) References Cited

FOREIGN PATENT DOCUMENTS

| CN | 104874295 A | * | 9/2015 |
| CN | 105778158 | | 7/2016 |

(Continued)

OTHER PUBLICATIONS

Zhang et al—CN 107583470 A machine translation—Jan. 16, 2018 (Year: 2018).*

(Continued)

*Primary Examiner* — Bradley R Spies
(74) *Attorney, Agent, or Firm* — EVAN LAW GROUP LLC

(57) ABSTRACT

The present invention provides a hydrophilic/oleophobic sponge, a preparation method and use thereof, and belongs to the technical field of functional material preparation. In the present invention, a modified solution is obtained by mixing a nanoparticle suspension with a modifier solution; the nanoparticle suspension includes silica-encapsulated $Fe_3O_4$ nanoparticle suspension and/or nano-silica ethanol suspension; the modifier solution includes chitosan-acetic acid aqueous solution and polyvinyl alcohol (PVA) aqueous solution. The sponge is soaked in the modified solution, mixed and crosslinked with glutaraldehyde aqueous solution to obtain the hydrophilic/oleophobic sponge, conferring good oil-water separation ability on the sponge. The sponge effectively separates a heavy water layer from oil-water mixtures with such light oils as lubricating oil, engine oil, pump oil, crude oil, gasoline, and sunflower seed oil in a simple gravity-driven manner. The hydrophilic/oleophobic sponge prepared by the present invention has good application prospects in oil-water separation.

18 Claims, 3 Drawing Sheets

(52) U.S. Cl.
CPC ........ *C08J 2375/04* (2013.01); *C08J 2405/08* (2013.01); *C08J 2429/04* (2013.01)

(56) References Cited

FOREIGN PATENT DOCUMENTS

| | | | |
|---|---|---|---|
| CN | 107583470 | 1/2018 | |
| CN | 108101385 | 6/2018 | |
| CN | 109261127 A * | 1/2019 | ............. B01J 20/06 |
| CN | 109364888 | 2/2019 | |
| EP | 0113521 | 7/1984 | |
| JP | 59-97146 | 6/1984 | |

OTHER PUBLICATIONS

Wang et al—CN 108101385 A machine translation—Jun. 1, 2018 (Year: 2018).*
He et al—CN 109261127 A machine translation—Jan. 25, 2019 (Year: 2019).*
Liu et al—CN 104874295 A machine translation—Sep. 2, 2015 (Year: 2015).*
International Search Report for PCT application No. PCT/CN2019/091613 dated Jan. 2, 2020 with translation.

* cited by examiner

HYDROPHILIC/OLEOPHOBIC SPONGE, PREPARATION METHOD AND USE THEREOF

TECHNICAL FIELD

The present invention relates to the technical field of functional material preparation, and in particular to a hydrophilic/oleophobic sponge, a preparation method and use thereof.

BACKGROUND

So far, accidental massive oil spill and arbitrary oil discharge have posed serious threats to the human living environment and human health. People have long been seeking for a time-saving, convenient, handy and low-cost deoiling method. Recent research has indicated that oleophilic/hydrophobic material is a better option. In particular, a loose and porous oleophilic/hydrophobic sponge material not only prevents water penetration, but also has good adsorbability and permeability of oil and organic solvents; the material can separate a heavy oil layer (organic solvent layer) from a light water layer under gravity, saving a lot of time, manpower, material resources, and costs.

In most cases, however, oil has a lower density than water. Water will sink to the bottom, but the oil will float on the water. Moreover, lipophilicity of a sponge readily leads to clogging of sponge pores by organic pollutants after a long period of use, thereby reducing the oil-water separation ability of the oleophilic/hydrophobic sponge.

SUMMARY

In view of this, an objective of the present invention is to provide a preparation method of a hydrophilic/oleophobic sponge. The hydrophilic/oleophobic sponge prepared by the preparation method as provided by the present invention has good oil-water separation ability, realizing the efficient filtration and separation of oil-water mixtures.

Technical Solutions

In order to achieve the above objective, the present invention provides the following technical solutions:

The present invention provides a preparation method of a hydrophilic/oleophobic sponge, including the following steps:

mixing a nanoparticle suspension with a modifier solution to obtain a modified solution, where the nanoparticle suspension includes a silica-encapsulated $Fe_3O_4$ nanoparticle suspension and/or a nano-silica ethanol suspension, and the modifier solution is a mixture of chitosan-acetic acid aqueous solution and polyvinyl alcohol (PVA) aqueous solution; and soaking a sponge in the modified solution, mixing and crosslinking with glutaraldehyde aqueous solution to obtain the hydrophilic/oleophobic sponge.

Preferably, a volume ratio of the chitosan-acetic acid aqueous solution to the PVA aqueous solution is 1:2 to 15:1, a mass concentration of the chitosan-acetic acid aqueous solution is 0.19% to 4.80%, and a mass concentration of the PVA aqueous solution is 0.33% to 10.72%.

Preferably, the silica-encapsulated $Fe_3O_4$ nanoparticle suspension is prepared by the following steps:

in a nitrogen gas atmosphere, successively adding alkaline solution and trisodium citrate in an aqueous solution of soluble iron(III) and iron(II) salts to undergo coprecipitation to obtain a hydrophilic $Fe_3O_4$ suspension; and mixing tetraethoxysilane (TEOS) solution with the hydrophilic $Fe_3O_4$ suspension to undergo a hydrolysis-condensation reaction to obtain the silica-encapsulated $Fe_3O_4$ nanoparticle suspension.

Preferably, the nano-silica ethanol suspension is prepared by the following steps:

successively mixing tetraethyl orthosilicate and ammonia water with absolute alcohol to undergo a hydrolysis-condensation reaction, followed by washing and drying to obtain silica nanoparticles; and mixing the silica nanoparticles with absolute alcohol to obtain the nano-silica ethanol suspension.

Preferably, a mass ratio of the $Fe_3O_4$ nanoparticle in the silica-encapsulated $Fe_3O_4$ nanoparticle suspension to the modifiers in the modifier solution is 0.5:2.7 to 1.5:0.5; a mass ratio of the silica nanoparticle in the nano-silica ethanol suspension to the modifiers in the modifier solution is 0.5:2.7 to 1.5:0.5.

Preferably, the sponge includes melamine resin sponge and/or polyurethane sponge.

Preferably, a mass ratio of the modifiers in the modifier solution to the glutaraldehyde in the glutaraldehyde aqueous solution is (2.7-1.5):(0.020-0.10).

Preferably, the crosslinking reaction time is 10 to 14 h.

The present invention further provides a hydrophilic/oleophobic sponge prepared by the preparation method according to the above technical solutions. The hydrophilic/oleophobic sponge includes a sponge substrate and nanoparticles and modifiers supported on the surface of the sponge substrate, the nanoparticles include silica-encapsulated $Fe_3O_4$ nanoparticles and/or silica nanoparticles, and the modifiers include chitosan and PVA.

The present invention further provides use of the hydrophilic/oleophobic sponge of the above technical solutions in the field of oil-water separation of oil-water mixtures.

The present invention provides a preparation method of a hydrophilic/oleophobic sponge, including the following steps: mixing a nanoparticle suspension with a modifier solution to obtain a modified solution, where the nanoparticle suspension includes a silica-encapsulated $Fe_3O_4$ nanoparticle suspension and/or a nano-silica ethanol suspension, and the modifier solution includes chitosan-acetic acid aqueous solution and PVA aqueous solution; soaking a sponge in the modified solution, mixing and crosslinking with glutaraldehyde aqueous solution to obtain the hydrophilic/oleophobic sponge. In the present invention, the nanoparticle suspension is mixed with the modifier solution, followed by supporting on the surface of the sponge, so as to improve material hydrophilicity by increasing the microroughness of the sponge surface; moreover, both PVA and chitosan with characteristics of hydrophilic and oleophobic functional groups are mixed with glutaraldehyde aqueous solution, where the glutaraldehyde aqueous solution is crosslinked with chitosan and PVA, conferring good oil-water separation ability on the sponge. Data of examples indicate that underwater contact angles of hydrophilic/oleophobic sponges prepared by the preparation method provided by the present invention with dichloromethane are between 150 and 157 degrees, exhibiting good hydrophilic and oleophobic properties; the hydrophilic/oleophobic sponge effectively separates a heavy water layer from oil-water mixtures with such light oils as lubricating oil, engine oil, pump oil, crude oil, gasoline, and sunflower seed oil in a simple gravity-driven manner.

Beneficial Effects

BRIEF DESCRIPTION OF DRAWINGS

The present invention will be further described in detail below with reference to the drawings and specific examples.

DETAILED DESCRIPTION

Figure 1:
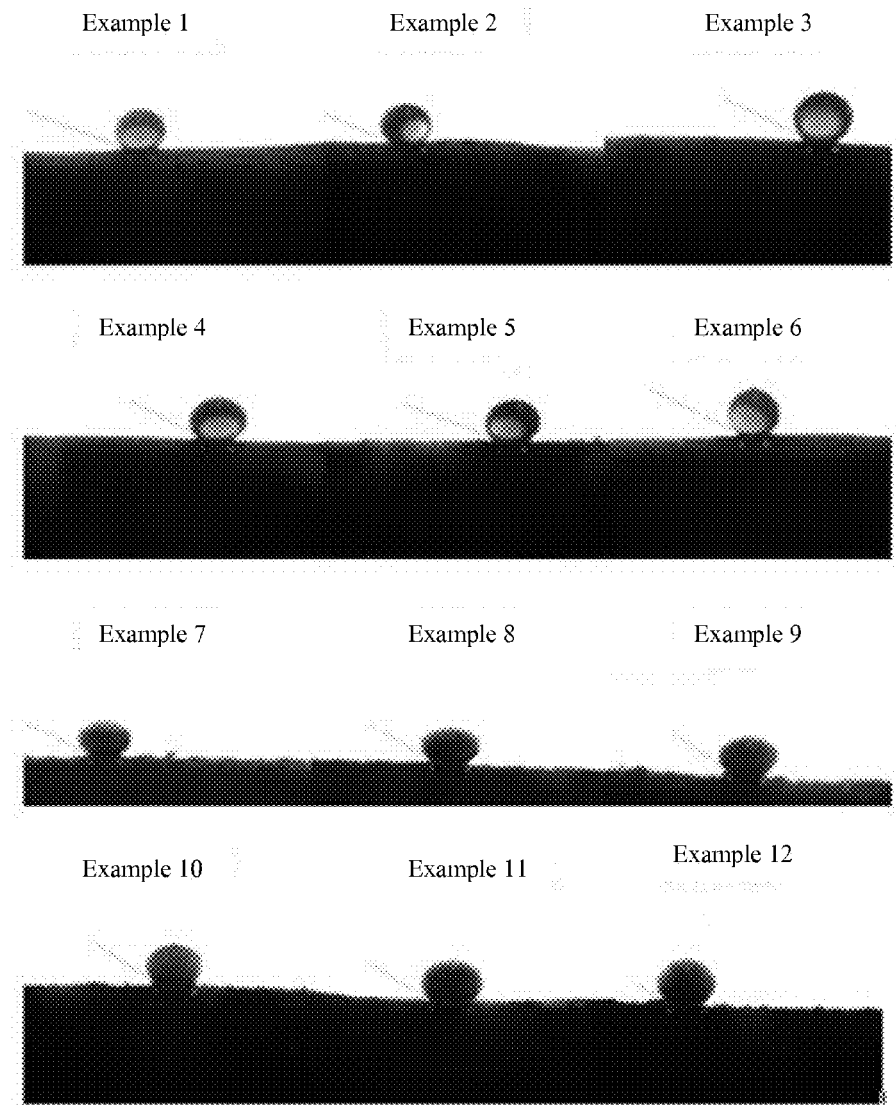
FIG. 1 illustrates underwater contact angles of hydrophilic/oleophobic sponges prepared in Examples 1 to 12 with dichloromethane.

The present invention provides a preparation method of a hydrophilic/oleophobic sponge, including the following steps:

mixing a nanoparticle suspension with a modifier solution to obtain a modified solution, where the nanoparticle suspension includes a silica-encapsulated $Fe_3O_4$ nanoparticle suspension and/or a nano-silica ethanol suspension, and the modifier solution is a mixture of chitosan-acetic acid aqueous solution and polyvinyl alcohol (PVA) aqueous solution; and soaking a sponge in the modified solution, mixing and crosslinking with glutaraldehyde aqueous solution to obtain the hydrophilic/oleophobic sponge.

The nanoparticle suspension is mixed with the modifier solution to obtain the modified solution; the nanoparticle suspension includes a silica-encapsulated $Fe_3O_4$ nanoparticle suspension and/or a nano-silica ethanol suspension; the modifier solution includes chitosan-acetic acid aqueous solution and PVA aqueous solution.

In the present invention, the silica-encapsulated $Fe_3O_4$ nanoparticle suspension is preferably prepared by the following steps:

in a nitrogen gas atmosphere, successively adding alkaline solution and trisodium citrate in an aqueous solution of soluble iron(III) and iron(II) salts to undergo coprecipitation to obtain a hydrophilic $Fe_3O_4$ suspension; and mixing tetraethoxysilane (TEOS) solution with the hydrophilic $Fe_3O_4$ suspension to undergo a hydrolysis-condensation reaction to obtain the silica-encapsulated $Fe_3O_4$ nanoparticle suspension.

In the present invention, in a nitrogen gas atmosphere, alkaline solution and trisodium citrate are added successively in the aqueous solution of soluble iron(III) and iron(II) salts to undergo coprecipitation to obtain the hydrophilic $Fe_3O_4$ suspension. In the present invention, the soluble iron(III) salt is preferably $FeCl_3 \cdot 6H_2O$, and the soluble iron(II) salt is preferably $FeCl_2 \cdot 4H_2O$. In the present invention, the alkaline solution is preferably sodium hydroxide (NaOH) solution, and a mass concentration of the NaOH solution is preferably 0.09% to 0.16%. Specific sources of the $FeCl_3 \cdot 5H_2O$, the $FeCl_2 \cdot 4H_2O$, and the NaOH are not particularly limited in the present invention, as long as commercially available products used are well known in the art.

In the present invention, the soluble iron(III) and iron(II) salts are preferably dissolved in water to obtain the aqueous solution of soluble iron(III) and iron(II) salts. In the present invention, a ratio of soluble iron(III) salt:soluble iron(II) salt:water is preferably (1.2984-3.246 g):(0.4776-1.194 g):(12-30 mL), and more preferably 1.623 g:0.597 g:30 mL.

In the present invention, the soluble iron(III) and iron(II) salts are dissolved in water at a temperature of 40 to 60° C. Mode and time of the dissolution are not particularly limited in the present invention, as long as the dissolution mode used is conventional in the art, specifically, for example, agitating for 20 to 30 min. The agitation rate is not particularly limited in the present invention, as long as the rate satisfies the dissolution of the soluble iron(III) and iron(II) salts in water.

In the present invention, a mass ratio of the soluble iron(III) salt:alkaline solution:trisodium citrate is preferably (1.2984-3.246):(20.8-52):(0.125-0.4), and more preferably 1.623:26:0.125.

Order of mixing the alkaline solution with the trisodium citrate is not particularly limited in the present invention, as long as arbitrary order of mixing may be used. The mode of mixing the alkaline solution with the trisodium citrate is not particularly limited in the present invention, as long as the mixing mode used is conventional in the art.

In the present invention, the coprecipitation is preferably conducted at 80 to 90° C., and the coprecipitation time is preferably 1 to 2 h.

In the present invention, after coprecipitation, coprecipitation products are naturally cooled to room temperature, magnetically separated, and washed with deionized water 5 to 6 times; subsequently, deionized water is added to obtain the hydrophilic $Fe_3O_4$ suspension. In the present invention, a ratio of the soluble iron(III) salt to the deionized water is preferably (1.2984-3.246 g):(40-100 mL), and more preferably (1.2984-3.246 g):50 mL.

In the present invention, after the hydrophilic $Fe_3O_4$ suspension is obtained, the hydrophilic $Fe_3O_4$ suspension is preferably mixed with ammonia water and TEOS successively to undergo the hydrolysis-condensation reaction to obtain the silica-encapsulated $Fe_3O_4$ nanoparticle in the presence of nitrogen at room temperature. In the present invention, a ratio of $Fe_3O_4$ in the hydrophilic $Fe_3O_4$ suspension to ammonia water is preferably (1-3 g):(3-8 mL), and more preferably (1-3 g):(3.2-4 mL); a concentration of the ammonia water is preferably 25 wt %. Specific sources of the ammonia water are not particularly limited in the present invention, as long as commercially available products used are well known in the art. The mode and time of mixing the ammonia water with the hydrophilic $Fe_3O_4$ suspension are not particularly limited in the present invention, as long as the mixing mode used is conventional in the art, specifically, for example, agitating for 5 min.

In the present invention, a ratio of $Fe_3O_4$ in the hydrophilic $Fe_3O_4$ suspension to TEOS is preferably (0.5-1.5 g):(0.25-1 mL), and more preferably (0.5-1.5 g):(0.25-0.5 mL).

In the present invention, the modification reaction time is preferably 10 to 14 h, and more preferably 12 h; the modification reaction is preferably conducted at room temperature.

In the present invention, after completion of the modification reaction, modification reaction product is magnetically separated and washed with deionized water 5 to 6 times; subsequently, deionized water is added to obtain the silica-encapsulated $Fe_3O_4$ nanoparticle suspension. In the present invention, a ratio of $Fe_3O_4$ nanoparticle in the modification reaction product to deionized water is preferably (0.5-1.5 g):(30-90 mL), and more preferably (0.5-1.5 g):45 mL.

In the present invention, preferably, the nano-silica ethanol suspension is prepared by the following steps:
  successively mixing tetraethyl orthosilicate and ammonia water with absolute alcohol to undergo a hydrolysis-condensation reaction, followed by washing and drying to obtain silica nanoparticles; and
  mixing the silica nanoparticles with absolute alcohol to obtain the nano-silica ethanol suspension.

In the present invention, in a nitrogen atmosphere, tetraethyl orthosilicate and ammonia water are successively charged into absolute alcohol to undergo the hydrolysis-condensation reaction, followed by washing and drying to obtain silica nanoparticles. In the present invention, a volume ratio of the absolute alcohol:tetraethyl orthosilicate:ammonia water is preferably 100:10:10. In the present invention, the concentration of the ammonia water is preferably 25 wt %. Specific sources of the absolute alcohol, the tetraethyl orthosilicate, and the ammonia water are not particularly limited in the present invention, as long as commercially available products used are well known in the art.

In the present invention, the mixing is preferably conducted in a 250 mL Florence flask. The mixing mode is not particularly limited in the present invention, as long as the mixing mode used is conventional in the art. Particularly, for example, the opening of the Florence flask is capped with a glass stopper, followed by magnetic agitation for 1 h.

In the present invention, the hydrolysis-condensation reaction time is preferably 12 h; the hydrolysis-condensation reaction is preferably conducted at a temperature of 20° C. to 40° C.

In the present invention, after hydrolysis-condensation reaction products are obtained, the hydrolysis-condensation reaction products are washed with deionized water and centrifuged 4 to 5 times successively. In the present invention, after completion of centrifugation, the resulting washings are preferably washed with ethanol, followed by solid-liquid separation to obtain solids.

In the present invention, after solids are obtained, the resulting solids are preferably dried. Specific drying method is not particularly limited in the present invention, as long as the drying method used is conventional in the art. Particularly, the drying temperature is preferably 60° C., and the drying time is preferably 12 h.

After dried silica nanoparticles are obtained, the silica nanoparticles are mixed with absolute alcohol to obtain the nano-silica ethanol suspension.

In the present invention, preferably, the silica nanoparticles are mixed with absolute alcohol to obtain the nano-silica ethanol suspension under agitation. In the present invention, a ratio of the silica nanoparticles to the absolute alcohol solution is preferably (0.4-1.5 g):(20-75 mL).

In the present invention, the agitation time is preferably 2 h.

In the present invention, preferably, chitosan is charged into acetum and agitated at room temperature for 4 h to obtain a chitosan-acetic acid aqueous solution. In the present invention, a ratio of the chitosan to the acetum is preferably (0.3-1.5 g):(30-150 mL), and more preferably (0.35-0.6 g):(35-60 mL). In the present invention, a mass concentration of the acetum is preferably 1 wt % to 2 wt %. Specific sources of the chitosan and the acetum are not particularly limited in the present invention, as long as commercially available products used are well known in the art.

In the present invention, preferably, PVA is added and mixed with deionized water to obtain the PVA aqueous solution. In the present invention, a ratio of the PVA to the deionized water is preferably (0.2-1.2 g):(10-60 mL), and more preferably (0.32-0.6 g):(9.6-18 mL). Specific sources of the PVA are not particularly limited in the present invention, as long as commercially available products used are well known in the art. The mixing mode is not particularly limited in the present invention, as long as the mixing mode is conventional in the art, particularly, for example, agitation. In the present invention, the agitation time is preferably 2 h; the agitation is conducted at a temperature of 45° C. to 50° C.

In the present invention, preferably, the nanoparticle suspension is mixed with the modified solution in a round-bottom flask. In the present invention, preferably, the order of mixing the nanoparticle suspension with the modified solution is to mix the nanoparticle suspension with the chitosan-acetic acid aqueous solution and then with the PVA aqueous solution. In the present invention, when mixing the silica-encapsulated $Fe_3O_4$ nanoparticle suspension with the modified solution, a mass ratio of the $Fe_3O_4$ nanoparticle in the silica-encapsulated $Fe_3O_4$ nanoparticle suspension to the modifiers in the modifier solution is preferably 0.5:2.7 to 1.5:0.5; when mixing the nano-silica ethanol suspension with the modified solution, a mass ratio of the silica nanoparticle in the nano-silica ethanol suspension to the modifiers in the modifier solution is preferably 0.5:2.7 to 1.5:0.5; when mixing the silica-encapsulated $Fe_3O_4$ nanoparticle suspension and the nano-silica ethanol suspension with the modified solution, a mass ratio of the $Fe_3O_4$ nanoparticle and silica nanoparticle in the mixed suspension to the modifiers in the modifier solution is preferably 0.5:2.7 to 1.5:0.5.

In the present invention, a volume ratio of the chitosan-acetic acid aqueous solution to the PVA aqueous solution is preferably 1:2 to 15:1, a concentration of the chitosan-acetic acid aqueous solution is preferably 0.19% to 4.80%, and a concentration of the PVA aqueous solution is preferably 0.33% to 10.72%. The mixing mode is not particularly limited in the present invention, as long as the mixing mode used is conventional in the art, particularly, for example, agitation.

In the present invention, after the modified solution is obtained, a sponge is soaked in the modified solution, mixed and crosslinked with glutaraldehyde aqueous solution to obtain the hydrophilic/oleophobic sponge. In the present invention, the sponge is preferably melamine resin sponge and/or polyurethane sponge; the sponge is preferably 3×2×0.5 cm to 4×3×1 cm in volume. Specific sources of the sponge are not particularly limited in the present invention, as long as commercially available products used are well known in the art. In the present invention, 4 to 6 sponges are preferably soaked in the modified nanoparticle suspension.

In the present invention, a mass concentration of the glutaraldehyde aqueous solution is preferably 25% to 50%, and more preferably 50%.

In the present invention, a mass ratio of the modifiers in the modifier solution to the glutaraldehyde in the glutaraldehyde aqueous solution is preferably (2.7-1.5):(0.020-0.10), and more preferably (2.7-1.5):(0.05-0.075).

The mixing mode is not particularly limited in the present invention, as long as the mixing mode used is conventional in the art, particularly, for example, agitation. The agitation time is preferably 10 to 20 min. Rotational speed of the agitation is not particularly limited in the present invention, as long as agitation speed used is well known to those skilled in the art.

In the present invention, the crosslinking reaction time is preferably 10 to 14 h, and more preferably 12 h.

In the present invention, after completion of the crosslinking reaction, crosslinking reaction products are preferably dried to obtain the hydrophilic/oleophobic sponge. In the present invention, the drying is preferably conducted under vacuum; the drying temperature is preferably 50° C. to 60° C., and the drying time is preferably 20 h to 24 h.

The present invention further provides a hydrophilic/oleophobic sponge prepared by the preparation method according to the above technical solutions. The hydrophilic/oleophobic sponge includes a sponge substrate and nanoparticles and modifiers supported on the surface of the sponge substrate, the nanoparticles include silica-encapsulated $Fe_3O_4$ nanoparticles and/or silica nanoparticles, and the modifiers include chitosan and PVA.

The present invention further provides use of the hydrophilic/oleophobic sponge of the above technical solutions in the field of oil-water separation of oil-water mixtures.

In the present invention, the use preferably includes the following steps:

soaking the hydrophilic/oleophobic sponge in water until saturated, removing therefrom and blocking up the neck of a funnel, and pouring oil and water thereinto successively to realize the oil-water separation.

The hydrophilic/oleophobic sponge, the preparation method and the use thereof as provided by the present invention will be described in detail below in conjunction with the examples, but they should not be construed as limiting the scope of the invention.

Example 1

(1) 1.623 g of $FeCl_3 \cdot 6H_2O$ and 0.597 g of $FeCl_2 \cdot 4H_2O$ were dissolved in 30 mL of deionized water, followed by agitating for 30 min at 60° C. in a nitrogen atmosphere; 26 g of sodium hydroxide (NaOH) solution (NaOH 1 g, water 25 g) and 0.125 g of trisodium citrate were added successively and heated to 80° C., followed by reaction for 1 h under agitation; after reaction, the mixture was cooled to room temperature to obtain hydrophilic $Fe_3O_4$ particles; after magnetic separation, the hydrophilic $Fe_3O_4$ particles were washed with deionized water six times, and then mixed with 50 mL of deionized water to prepare a hydrophilic $Fe_3O_4$ particle suspension; 4 mL of ammonia water (25 wt %) was charged into the suspension, followed by agitating for 5 min; 0.25 mL of tetraethoxysilane (TEOS) was added, followed by reaction for 12 h under agitation at room temperature in a nitrogen atmosphere; silica-encapsulated $Fe_3O_4$ particles obtained after reaction were magnetically separated, washed with deionized water six times, and then mixed with deionized water to prepare 45 mL of silica-encapsulated $Fe_3O_4$ suspension.

(2) 0.6 g of chitosan was weighed, dissolved in 1 wt % acetum, and agitated at room temperature for 4 h to obtain 60 mL of chitosan-acetic acid aqueous solution.

(3) 0.6 g of polyvinyl alcohol (PVA) was weighed, dissolved in deionized water, and agitated at 50° C. for 2 h to obtain 18 mL of PVA aqueous solution.

(4) Next, 45 mL of silica-encapsulated $Fe_3O_4$ suspension and 60 mL of chitosan-acetic acid aqueous solution were charged into a round-bottom flask, and agitated for 3 min; subsequently, 18 mL of PVA aqueous solution was added and agitated for 5 min; next, six melamine sponges (4×2.5×0.7 cm) were soaked in the foregoing mixed solution and agitated for 15 min; 0.075 mL of glutaraldehyde aqueous solution was added and agitated for 12 h; finally, the sponges were removed from the mixed solution and directly dried under vacuum at 60° C. for 24 h to obtain hydrophilic/oleophobic sponges.

Figure 2:
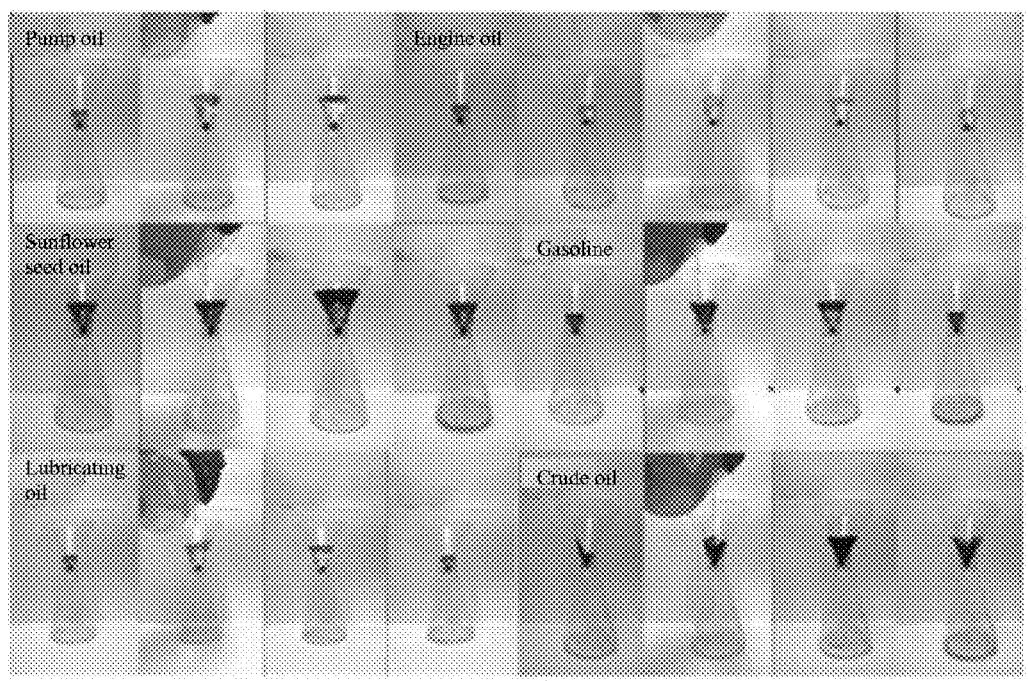
FIG. 2 illustrates effects of oil-water separation of hydrophilic/oleophobic sponges prepared in Examples 1 to 6.

The resulting modified sponge had an underwater contact angle of 157 degrees with dichloromethane, as shown in FIG. 1. The resulting modified sponge was soaked in water and blocked up the neck of a funnel; after adding lubricating oil and water successively, the sponge effectively separated the mixture of water and lubricating oil under gravity. Separation process thereof is illustrated in FIG. 2.

Example 2

(1) The procedure was the same as step (1) in Example 1.

(2) 0.4 g of chitosan was weighed, dissolved in 1 wt % acetum, and agitated at room temperature for 4 h to obtain 40 mL of chitosan-acetic acid aqueous solution.

(3) 0.4 g of polyvinyl alcohol (PVA) was weighed, dissolved in deionized water, and agitated at 50° C. for 2 h to obtain 12 mL of PVA aqueous solution.

(4) Next, 45 mL of silica-encapsulated $Fe_3O_4$ suspension and 40 mL of chitosan-acetic acid aqueous solution were charged into a round-bottom flask, and agitated for 3 min; subsequently, 12 mL of PVA aqueous solution was added and agitated for 5 min; next, six melamine sponges (4×2.5×0.7 cm) were soaked in the foregoing mixed solution and agitated for 15 min; 0.075 mL of glutaraldehyde aqueous solution was added and agitated for 12 h; finally, the sponges were removed from the mixed solution and directly dried under vacuum at 60° C. for 24 h to obtain hydrophilic/oleophobic sponges. The resulting modified sponge had an underwater contact angle of 154 degrees with dichloromethane, as shown in FIG. 1. The resulting modified sponge was soaked in water and blocked up the neck of a funnel; after adding engine oil and water successively, the sponge effectively separated the mixture of water and engine oil under gravity. Separation process thereof is illustrated in FIG. 2.

Example 3

(1) The procedure was the same as step (1) in Example 1.

(2) The procedure was the same as step (2) in Example 1.

(3) 0.72 g of polyvinyl alcohol (PVA) was weighed, dissolved in deionized water, and agitated at 50° C. for 2 h to obtain 21.6 mL of PVA aqueous solution.

(4) Next, 45 mL of silica-encapsulated $Fe_3O_4$ suspension and 60 mL of chitosan-acetic acid aqueous solution were charged into a round-bottom flask, and agitated for 3 min; subsequently, 21.6 mL of PVA aqueous solution was added and agitated for 5 min; next, six melamine sponges (4×2.5×0.7 cm) were soaked in the foregoing mixed solution and agitated for 15 min; 0.075 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting modified sponge had an underwater contact angle of 154 degrees with dichloromethane, as shown in FIG. 1. The resulting modified sponge was soaked in water and blocked up the neck of a funnel; after adding pump oil and water successively, the sponge effectively separated the mixture of water and pump oil under gravity. Separation process thereof is illustrated in FIG. 2.

Example 4

(1) The procedure was the same as step (1) in Example 1.
(2) The procedure was the same as step (2) in Example 2.
(3) 0.48 g of polyvinyl alcohol (PVA) was weighed, dissolved in deionized water, and agitated at 50° C. for 2 h to obtain 14.4 mL of PVA aqueous solution.
(4) Next, 45 mL of silica-encapsulated $Fe_3O_4$ suspension and 40 mL of chitosan-acetic acid aqueous solution were charged into a round-bottom flask, and agitated for 3 min; subsequently, 14.4 mL of PVA aqueous solution was added and agitated for 5 min; next, six melamine sponges (4×2.5×0.7 cm) were soaked in the foregoing mixed solution and agitated for 15 min; 0.075 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting modified sponge had an underwater contact angle of 154 degrees with dichloromethane, as shown in FIG. 1. The resulting modified sponge was soaked in water and blocked up the neck of a funnel; after adding crude oil and water successively, the sponge effectively separated the mixture of water and crude oil under gravity. Separation process thereof is illustrated in FIG. 2.

Example 5

(1) The procedure was the same as step (1) in Example 1.
(2) The procedure was the same as step (2) in Example 1.
(3) 0.48 g of polyvinyl alcohol (PVA) was weighed, dissolved in deionized water, and agitated at 50° C. for 2 h to obtain 14.4 mL of PVA aqueous solution.
(4) Next, 45 mL of silica-encapsulated $Fe_3O_4$ suspension and 60 mL of chitosan-acetic acid aqueous solution were charged into a round-bottom flask, and agitated for 3 min; subsequently, 14.4 mL of PVA aqueous solution was added and agitated for 5 min; next, six melamine sponges (4×2.5×0.7 cm) were soaked in the foregoing mixed solution and agitated for 15 min; 0.075 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting modified sponge had an underwater contact angle of 156 degrees with dichloromethane, as shown in FIG. 1. The resulting modified sponge was soaked in water and blocked up the neck of a funnel; after adding gasoline and water successively, the sponge effectively separated the mixture of water and gasoline under gravity. Separation process thereof is illustrated in FIG. 2.

Example 6

(1) The procedure was the same as step (1) in Example 1.
(2) The procedure was the same as step (2) in Example 2.
(3) 0.32 g of polyvinyl alcohol (PVA) was weighed, dissolved in deionized water, and agitated at 50° C. for 2 h to obtain 9.6 mL of PVA aqueous solution.
(4) Next, 45 mL of silica-encapsulated $Fe_3O_4$ suspension and 40 mL of chitosan-acetic acid aqueous solution were charged into a round-bottom flask, and agitated for 3 min; subsequently, 9.6 mL of PVA aqueous solution was added and agitated for 5 min; next, six melamine sponges (4×2.5×0.7 cm) were soaked in the foregoing mixed solution and agitated for 15 min; 0.075 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting modified sponge had an underwater contact angle of 156 degrees with dichloromethane, as shown in FIG. 1. The resulting modified sponge was soaked in water and blocked up the neck of a funnel; after adding sunflower seed oil and water successively, the sponge effectively separated the mixture of water and sunflower seed oil under gravity. Separation process thereof is illustrated in FIG. 2.

FIG. 2 illustrates effects of oil-water separation of hydrophilic/oleophobic sponges prepared in Examples 1 to 6. From FIG. 2, the hydrophilic/oleophobic sponge prepared by the present invention has good hydrophilic and oleophobic properties. The sponge effectively filtrates such light oils as pump oil (using the hydrophilic/oleophobic sponge prepared in Example 1), engine oil (using the hydrophilic/oleophobic sponge prepared in Example 2), sunflower seed oil (using the hydrophilic/oleophobic sponge prepared in Example 3), gasoline (using the hydrophilic/oleophobic sponge prepared in Example 4), lubricating oil (using the hydrophilic/oleophobic sponge prepared in Example 5), and crude oil (using the hydrophilic/oleophobic sponge prepared in Example 6) in a simple gravity-driven manner, so that a heavy water layer is separated from oils effectively.

Example 7

(1) 100 mL of absolute alcohol was measured and charged into a 250 mL Florence flask under magnetic agitation; 10 mL each of tetraethyl orthosilicate and ammonia water (25 wt %) was measured and charged into absolute alcohol successively; the opening of the Florence flask was capped with a glass stopper; magnetic agitation was terminated 1 h after constant agitation. A white silica suspension was obtained 12 h after standing and reaction. Subsequently, the suspension was washed repeatedly with distilled water, followed by centrifugal separation; the suspension was finally washed with ethanol and ultimately dried at 60° C. Under agitation, 0.5 g of dried $SiO_2$ powder was charged into absolute alcohol and agitated at room temperature for 2 h to obtain 25 mL of nano-silica ethanol suspension.
(2) 0.4 g of chitosan was weighed, dissolved in 1 wt % acetum, and agitated at room temperature for 4 h to obtain 40 mL of chitosan-acetic acid solution.
(3) 0.2 g of polyvinyl alcohol (PVA) was weighed, dissolved in deionized water, and agitated at 50° C. for 2 h to obtain 10 mL of PVA aqueous solution.
(4) Next, 25 mL of nano-silica ethanol suspension and 40 mL of chitosan-acetic acid aqueous solution were charged into a round-bottom flask, and agitated for 3 min; subsequently, 10 mL of PVA aqueous solution was added and agitated for 5 min; next, four polyurethane sponges (4×2.5×0.7 cm) were soaked in the foregoing mixed solution and agitated for 15 min; 0.05 mL of glutaraldehyde aqueous solution was added and agitated for 12 h; finally, the sponges were removed from the mixed solution and directly dried under vacuum at 60° C. for 24 h to obtain hydrophilic/oleophobic sponges.

Figure 3:
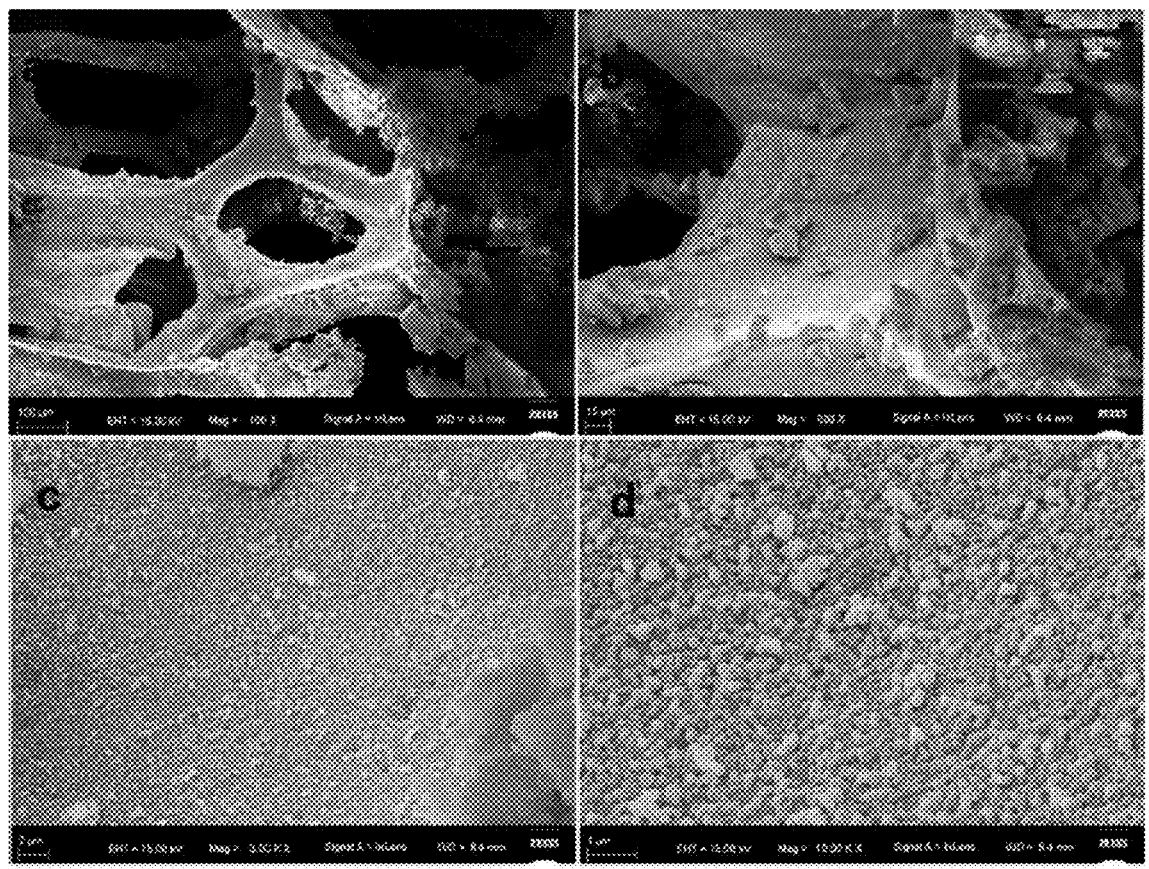
FIG. 3 illustrates SEM results of hydrophilic/oleophobic sponges prepared in Example 7 at different magnifications, where panel a shows an SEM image of a hydrophilic/oleophobic sponge at 100-fold magnification, panel b shows an SEM image of a hydrophilic/oleophobic sponge at 500-fold magnification, panel c shows an SEM image of a hydrophilic/oleophobic sponge at 3,000-fold magnification, and panel d shows an SEM image of a hydrophilic/oleophobic sponge at 10,000-fold magnification.

SEM results of the resulting hydrophilic/oleophobic sponges are illustrated in FIG. 3, where panel a shows an SEM image of a hydrophilic/oleophobic sponge at 100-fold magnification, panel b shows an SEM image of a hydrophilic/oleophobic sponge at 500-fold magnification, panel c shows an SEM image of a hydrophilic/oleophobic sponge at 3,000-fold magnification, and panel d shows an SEM image of a hydrophilic/oleophobic sponge at 10,000-fold magnification. The sponge had an underwater contact angle of 151 degrees with dichloromethane, as shown in FIG. 1. From FIG. 3, silica nanoparticles are supported on the surface of the sponge scaffold uniformly.

Example 8

(1) The procedure was the same as step (1) in Example 7.
(2) 0.35 g of chitosan was weighed, dissolved in 1 wt % acetum, and agitated at room temperature for 4 h to obtain 35 mL of chitosan-acetic acid aqueous solution.
(3) 0.4 g of polyvinyl alcohol (PVA) was weighed, dissolved in deionized water, and agitated at 50° C. for 2 h to obtain 20 mL of PVA aqueous solution.
(4) Next, 25 mL of nano-silica ethanol suspension and 35 mL of chitosan-acetic acid aqueous solution were charged into a round-bottom flask, and agitated for 3 min; subsequently, 20 mL of PVA aqueous solution was added and agitated for 5 min; next, four polyurethane sponges (4×2.5×0.7 cm) were soaked in the foregoing mixed solution and agitated for 15 min; 0.05 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting hydrophilic/oleophobic sponge had an underwater contact angle of 152 degrees with dichloromethane, as shown in FIG. 1.

Example 9

(1) 100 mL of absolute alcohol was measured and added into a 250 mL Florence flask under magnetic agitation; 10 mL each of tetraethyl orthosilicate and ammonia water (25 wt %) was measured and charged into absolute alcohol successively; the opening of the Florence flask was capped with a glass stopper; magnetic agitation was terminated 1 h after constant agitation. A white silica suspension was obtained 12 h after standing and reaction. Subsequently, the suspension was washed repeatedly with distilled water, followed by centrifugal separation; the suspension was finally washed with ethanol and ultimately dried at 60° C. Under agitation, 0.4 g of dried $SiO_2$ powder was charged into absolute alcohol and agitated at room temperature for 2 h to obtain 20 mL of nano-silica ethanol suspension.
(2) The procedure was the same as step (2) in Example 7.
(3) The procedure was the same as step (3) in Example 7.
(4) Next, 25 mL of nano-silica ethanol suspension and 40 mL of chitosan-acetic acid aqueous solution were charged into a round-bottom flask, and agitated for 3 min; subsequently, 10 mL of PVA aqueous solution was added and agitated for 5 min; next, four polyurethane sponges (4×2.5×0.7 cm) were soaked in the foregoing mixed solution and agitated for 15 min; 0.05 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting hydrophilic/oleophobic sponge had an underwater contact angle of 150 degrees with dichloromethane, as shown in FIG. 1.

Example 10

(1) 1.2984 g of $FeCl_3 \cdot 6H_2O$ and 0.4776 g of $FeCl_2 \cdot 4H_2O$ were dissolved in 12 mL of deionized water, followed by agitating for 30 min at 60° C. in a nitrogen atmosphere; 20.8 g of sodium hydroxide (NaOH) solution (NaOH 0.8 g, water 20 g) and 0.128 g of trisodium citrate were added successively and heated to 80° C., followed by reaction for 1 h under agitation. After reaction, the mixture was cooled to room temperature to obtain hydrophilic $Fe_3O_4$ particles; after magnetic separation, the hydrophilic $Fe_3O_4$ particles were washed with deionized water six times, and then mixed with 40 mL of deionized water to prepare a suspension; 3.2 mL of ammonia water (25 wt %) was charged into the suspension, followed by agitating for 5 min; 0.4 mL of tetraethoxysilane (TEOS) was added, followed by reaction for 12 h under agitation at room temperature in a nitrogen atmosphere; silica-encapsulated $Fe_3O_4$ particles obtained after reaction were magnetically separated, washed with deionized water six times, and then mixed with deionized water to prepare 45 mL of silica-encapsulated $Fe_3O_4$ suspension.
(2) 100 mL of absolute alcohol was measured and added into a 250 mL Florence flask under magnetic agitation; 10 mL each of tetraethyl orthosilicate and ammonia water (25 wt %) was measured and charged into absolute alcohol successively; the opening of the Florence flask was capped with a glass stopper; magnetic agitation was terminated 1 h after constant agitation. A white silica suspension was obtained 12 h after standing and reaction. Subsequently, the suspension was washed repeatedly with distilled water, followed by centrifugal separation; the suspension was finally washed with ethanol and ultimately dried at 60° C. Under agitation, 0.8 g of dried $SiO_2$ powder was charged into absolute alcohol and agitated at room temperature for 2 h to obtain 40 mL of nano-silica ethanol suspension.
(3) The procedure was the same as step (2) in Example 7.
(4) The procedure was the same as step (3) in Example 7.
(5) Next, 45 mL of silica-encapsulated $Fe_3O_4$ suspension, 40 mL of nano-silica ethanol suspension, and 40 mL of chitosan-acetic acid aqueous solution were charged into a round-bottom flask, and agitated for 3 min; subsequently, 10 mL of PVA aqueous solution was added and agitated for 5 min; next, four polyurethane sponges (4×2.5×0.7 cm) were soaked in the foregoing mixed solution and agitated for 15 min; 0.05 mL of glutaraldehyde aqueous solution was added and agitated for 12 h; finally, the sponges were removed from the mixed solution and directly dried under vacuum at 60° C. for 24 h to obtain hydrophilic/oleophobic sponges. The resulting hydrophilic/oleophobic sponge had an underwater contact angle of 152 degrees with dichloromethane, as shown in FIG. 1.

Example 11

(1) The procedure was the same as step (1) in Example 10.
(2) The procedure was the same as step (2) in Example 10.
(3) 0.3 g of chitosan was weighed, dissolved in 1 wt % acetum, and agitated at room temperature for 4 h to obtain 30 mL of chitosan-acetic acid aqueous solution.
(4) The procedure was the same as step (3) in Example 7.
(5) Next, 45 mL of silica-encapsulated $Fe_3O_4$ suspension, 40 mL of nano-silica ethanol suspension, and 30 mL of chitosan-acetic acid aqueous solution were charged into a round-bottom flask, and agitated for 3 min; subsequently, 10 mL of PVA aqueous solution was added and agitated for 5 min; next, four polyurethane sponges (4×2.5×0.7 cm) were soaked in the foregoing mixed solution and agitated for 15 min; 0.05 mL of glutaraldehyde aqueous solution was added and agitated for 12 h; finally, the sponges were removed from the mixed solution and directly dried under vacuum at 60° C. for 24 h to obtain hydrophilic/oleophobic sponges. The resulting hydrophilic/oleophobic sponge had an underwater contact angle of 152 degrees with dichloromethane, as shown in FIG. 1.

Example 12

(1) The procedure was the same as step (1) in Example 10.
(2) The procedure was the same as step (2) in Example 10.
(3) The procedure was the same as step (2) in Example 7.
(4) The procedure was the same as step (3) in Example 8.
(5) Next, 45 mL of silica-encapsulated $Fe_3O_4$ suspension, 40 mL of nano-silica ethanol suspension, and 40 mL of chitosan-acetic acid aqueous solution were charged into a round-bottom flask, and agitated for 3 min; subsequently, 20 mL of PVA aqueous solution was added and agitated for 5 min; next, four polyurethane sponges (4×2.5×0.7 cm) were soaked in the foregoing mixed solution and agitated for 15 min; 0.05 mL of glutaraldehyde aqueous solution was added and agitated for 12 h; finally, the sponges were removed from the mixed solution and directly dried under vacuum at 60° C. for 24 h to obtain hydrophilic/oleophobic sponges.

The resulting hydrophilic/oleophobic sponge had an underwater contact angle of 152 degrees with dichloromethane, as shown in FIG. 1.

FIG. 1 illustrates underwater contact angles of hydrophilic/oleophobic sponges prepared in Examples 1 to 12 with dichloromethane. From FIG. 1, underwater contact angles of hydrophilic/oleophobic sponges prepared by the present invention with dichloromethane are between 150 and 157 degrees, exhibiting good hydrophilic and oleophobic properties.

The above description is only preferred examples of the present invention. It should be pointed out that, for those of ordinary skills in the art, several improvements and modifications can be made without departing from the principle of the present invention. These improvements and modifications should also be considered as falling into the claimed scope of the present invention.

What is claimed is:

1. A preparation method of a hydrophilic/oleophobic sponge, comprising the following steps:

mixing a nanoparticle suspension with a modifier solution to obtain a modified solution, wherein the nanoparticle suspension comprises a silica-encapsulated $Fe_3O_4$ nanoparticle suspension and/or a nano-silica ethanol suspension, and the modifier solution is a mixture of chitosan-acetic acid aqueous solution and polyvinyl alcohol (PVA) aqueous solution; and soaking a sponge in the modified solution, mixing and crosslinking with glutaraldehyde aqueous solution to obtain the hydrophilic/oleophobic sponge:

wherein a mass ratio of modifiers in the modifier solution to glutaraldehyde in the glutaraldehyde aqueous solution is (2.7-1.5):(0.020-0.10).

2. The preparation method according to claim 1, wherein a volume ratio of the chitosan-acetic acid aqueous solution to the PVA aqueous solution is 1:2 to 15:1, a mass concentration of the chitosan-acetic acid aqueous solution is 0.19% to 4.80%, and a mass concentration of the PVA aqueous solution is 0.33% to 10.72%.

3. The preparation method according to claim 1, wherein under the condition that the nanoparticle suspension comprises the silica-encapsulated $Fe_3O_4$ nanoparticle suspension, the silica-encapsulated $Fe_3O_4$ nanoparticle suspension is prepared by the following steps:

in a nitrogen gas atmosphere, successively adding alkaline solution and trisodium citrate in an aqueous solution of soluble iron(III) and iron(II) salts to undergo coprecipitation to obtain a hydrophilic $Fe_3O_4$ suspension; and mixing tetraethoxysilane (TEOS) solution with the hydrophilic $Fe_3O_4$ suspension to undergo a hydrolysis-condensation reaction to obtain the silica-encapsulated $Fe_3O_4$ nanoparticle suspension.

4. The preparation method according to claim 1, wherein under the condition that the nanoparticle suspension comprises the nano-silica ethanol suspension, the nano-silica ethanol suspension is prepared by the following steps:

successively mixing tetraethyl orthosilicate and ammonia water with absolute alcohol to undergo a hydrolysis-condensation reaction, followed by washing and drying to obtain silica nanoparticles; and mixing the silica nanoparticles with absolute alcohol to obtain the nano-silica ethanol suspension.

5. The preparation method according to claim 1, wherein under the condition that the nanoparticle suspension comprises the silica-encapsulated $Fe_3O_4$ nanoparticle suspension, a mass ratio of $Fe_3O_4$ nanoparticle in the silica-encapsulated $Fe_3O_4$ nanoparticle suspension to modifiers in the modifier solution is 0.5:2.7 to 1.5:0.5; and under the condition that the nanoparticle suspension comprises the nano-silica ethanol suspension, a mass ratio of silica nanoparticle in the nano-silica ethanol suspension to the modifiers in the modifier solution is 0.5:2.7 to 1.5:0.5.

6. The preparation method according to claim 1, wherein the sponge comprises melamine resin sponge and/or polyurethane sponge.

7. The preparation method according to claim 1, wherein the crosslinking reaction time is 10 h to 14 h.

8. A hydrophilic/oleophobic sponge prepared by the preparation method according to claim 1, wherein the hydrophilic/oleophobic sponge comprises a sponge substrate and nanoparticles and modifiers supported on the surface of the sponge substrate, the nanoparticles comprise silica-encapsulated $Fe_3O_4$ nanoparticles and/or silica nanoparticles, and the modifiers comprise chitosan and PVA.

9. A hydrophilic/oleophobic sponge prepared by the preparation method according to claim 2, wherein the hydrophilic/oleophobic sponge comprises a sponge substrate and nanoparticles and modifiers supported on the surface of the sponge substrate, the nanoparticles comprise silica-encapsulated $Fe_3O_4$ nanoparticles and/or silica nanoparticles, and the modifiers comprise chitosan and PVA.

10. A hydrophilic/oleophobic sponge prepared by the preparation method according to claim 3, wherein the hydrophilic/oleophobic sponge comprises a sponge substrate and nanoparticles and modifiers supported on the surface of the sponge substrate, the nanoparticles comprise silica-encapsulated $Fe_3O_4$ nanoparticles, and the modifiers comprise chitosan and PVA.

11. A hydrophilic/oleophobic sponge prepared by the preparation method according to claim 4, wherein the hydrophilic/oleophobic sponge comprises a sponge substrate and nanoparticles and modifiers supported on the surface of the sponge substrate, the nanoparticles comprise silica nanoparticles, and the modifiers comprise chitosan and PVA.

12. A hydrophilic/oleophobic sponge prepared by the preparation method according to claim 5, wherein the hydrophilic/oleophobic sponge comprises a sponge substrate, and nanoparticles and modifiers supported on the surface of the sponge substrate, the nanoparticles comprise silica-encapsulated $Fe_3O_4$ nanoparticles and/or silica nanoparticles, and the modifiers comprise chitosan and PVA.

13. A hydrophilic/oleophobic sponge prepared by the preparation method according to claim 6, wherein the hydrophilic/oleophobic sponge comprises a sponge substrate and nanoparticles and modifiers supported on the surface of the sponge substrate, the nanoparticles comprise silica-encapsulated $Fe_3O_4$ nanoparticles and/or silica nanoparticles, and the modifiers comprise chitosan and PVA.

14. A hydrophilic/oleophobic sponge prepared by the preparation method according to claim 7, wherein the hydrophilic/oleophobic sponge comprises a sponge substrate and nanoparticles and modifiers supported on the surface of the sponge substrate, the nanoparticles comprise silica-encapsulated $Fe_3O_4$ nanoparticles and/or silica nanoparticles, and the modifiers comprise chitosan and PVA.

15. A method of separating an oil-water mixture, comprising filtering the oil-water mixture with the hydrophilic/oleophobic sponge according to claim 8.

16. A method of separating an oil-water mixture, comprising filtering the oil-water mixture with the hydrophilic/oleophobic sponge according to claim 9.

17. A method of separating an oil-water mixture, comprising filtering the oil-water mixture with the hydrophilic/oleophobic sponge according to claim 10.

18. A method of separating an oil-water mixture, comprising filtering the oil-water mixture with the hydrophilic/oleophobic sponge according to claim 11.

* * * * *